United States Patent [19]
Figge et al.

[11] 3,941,465
[45] Mar. 2, 1976

[54] FILM HANDLING APPARATUS CONTROL SYSTEM

[75] Inventors: Erwin E. Figge, Des Plaines; Kenyon A. Hapke, Libertyville; George C. Karalus, Arlington Heights; Robert C. Lenell, Chicago, all of Ill.

[73] Assignee: Bell & Howell Company, Chicago, Ill.

[22] Filed: June 28, 1973

[21] Appl. No.: 374,284

[52] U.S. Cl................................ 352/130; 352/72
[51] Int. Cl.²........................................ G03C 11/00
[58] Field of Search.......... 352/130, 72, 78 R, 78 C; 95/89 R, 13

[56] References Cited
UNITED STATES PATENTS

| | | | |
|---|---|---|---|
| 2,009,442 | 7/1935 | Foster | 352/124 |
| 3,771,861 | 11/1973 | Land | 352/130 |
| 3,800,306 | 3/1974 | Land | 352/130 X |

*Primary Examiner*—Monroe H. Hayes
*Attorney, Agent, or Firm*—Olds & Cook, Ltd.

[57] ABSTRACT

A control system for a cinematographic film cassette processor/projector unit. The control system includes a function programmer comprising an operating cycle selector responsive to a processed/unprocessed indicator on the cassette to program the control system for either a processed-film operating cycle or an unprocessed-film operating cycle and a logic unit for programming the sequence and execution of the plural operational modes of the apparatus during an operating cycle. The control system further includes a reel drive control circuit having plural speed and direction drive control modes programmed by the function programmer, a mode change actuator circiut responsive to cessation of film movement to actuate a change in the operational mode of the processor/projector by changing the logic state of the logic disc assembly, and a manually-actuatable replay circuit.

24 Claims, 10 Drawing Figures

FILM HANDLING APPARATUS CONTROL SYSTEM

This invention relates to film handling and, in particular, to a control system for film handling apparatus for film contained in a cassette.

Recent technological advances have made possible a rapid-process cassette system of motion picture photography which permits the photographer himself to expose, process, and project a length of motion picture film all without removing the film from the cassette. Rapid-process film cassettes of the type referred to are described, for example, in U.S. Pat. No. 3,608,455.

In the rapid-process cassette system, the film cassette is internally provided with processing means comprising a supply of development fluid contained in a rupturable container or pod and an applicator for applying the development fluid to the film emulsion. During exposure in a camera adapted to receive the cassette, the film is advanced from the cassette supply reel to the cassette take-up reel. To process the exposed film, the cassette is removed from the camera and inserted into a processor/projector unit. The development fluid pod in the cassette is ruptured, and a drive system is actuated to transport the exposed film from the take-up reel back to the supply reel. As the film is transported to the supply reel, the applicator within the cassette deposits a coating of the development fluid on the film emulsion surface to effect rapid processing of the film. The film may then be projected by actuating a projection drive shuttle to advance the film from the supply reel to the take-up reel. Following projection, the film may be rewound onto the supply reel and conveniently stored in the cassette in readiness for subsequent viewing. Such previously processed films may be viewed when desired by inserting the cassette into the processor/projector unit and operating the unit in the projection mode only.

It should be understood at this juncture that since the processor/projector unit is called upon to perform plural operations and functions, the control and sequencing of functions of the unit can present a complex task for the operator. Accordingly, it is the principal object of this invention to simplify the task of the operator by providing a control system for programming and controlling the functions of the processor/projector unit.

The control system of the present invention includes a function programmer having plural logic states for programming the sequence and execution of plural operational modes of the apparatus, reel drive control means having plural drive control modes adapted to be programmed by said function programmer, and a mode change actuator responsive to cessation of film movement for changing the logic state of the function programmer. The function programmer comprises an operating cycle selector for programming the control system for either processed-film operating cycle or an unprocessed-film operating cycle and a logic unit for programming the sequence and execution of the plural operational modes of the apparatus during an operating cycle. The operating cycle selector is preferably automatically responsive to a processed/unprocessed indicator provided on the cassette.

In an unprocessed-film operating cycle, the function programmer is effective to program the apparatus first for execution of a "take-up" mode comprising a wind-up onto the take-up reel without projection illumination of any remaining film supply. Upon cessation of film movement toward the take-up reel, the mode change actuator functions to advance the logic unit to direct execution of a "develop" mode in which the film is transported from the take-up reel to the supply reel without exposure to ambient light for the application of development fluid to the film emulsion. Upon cessation of film movement toward the supply reel, the mode change actuator operates following a predetermined delay period to advance the logic unit to direct execution of a mandatory "project" mode in which the film is transported by the projection shuttle from the supply reel to the take-up reel with the projection lamp energized for simultaneously drying and projecting the film. Upon cessation of film movement toward the take-up reel, the mode change actuator functions to advance the logic unit to direct execution of a "rewind" mode in which the film is returned from the take-up reel to the supply reel. Upon cessation of film movement toward the supply reel, the mode change actuator functions to advance the logic unit to the "off" mode for apparatus de-energization and cassette ejection.

In response to the insertion of a previously processed cassette, the control system directs execution of only the project mode and the rewind mode, prior to off mode de-energization and cassette ejection.

A further feature of the control system of this invention is the provision of a replay means which in response to a momentary manual actuation operates to interrupt projection to effect rewind of a short length of film followed by return to the project mode without interim de-energization of the apparatus by simulating the develop mode conditions during mode change from rewind to project.

Other features and objects of the present invention will be apparent from the following detailed description considered in conjunction with the accompanying drawings.

Figure 1:
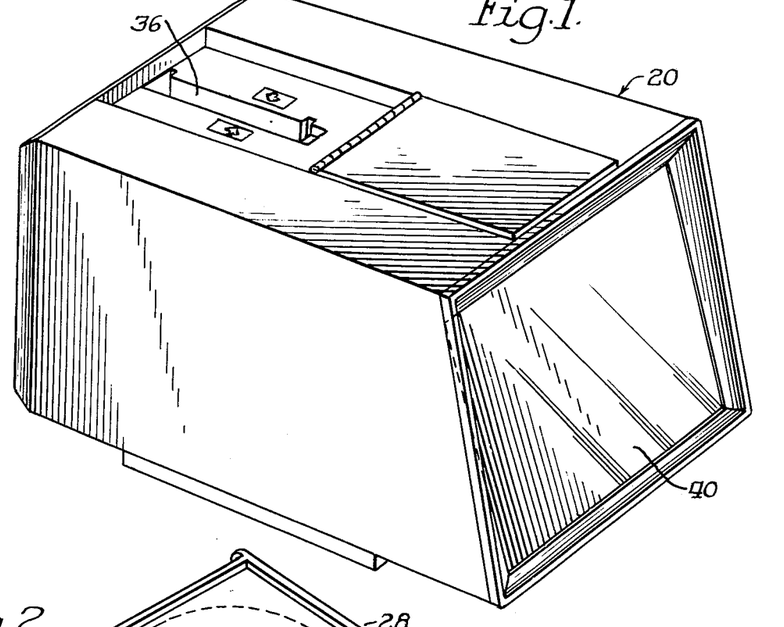
FIG. 1 is an isometric view of a processor/projector unit of the type controlled by the system of the present invention.
Figure 2:
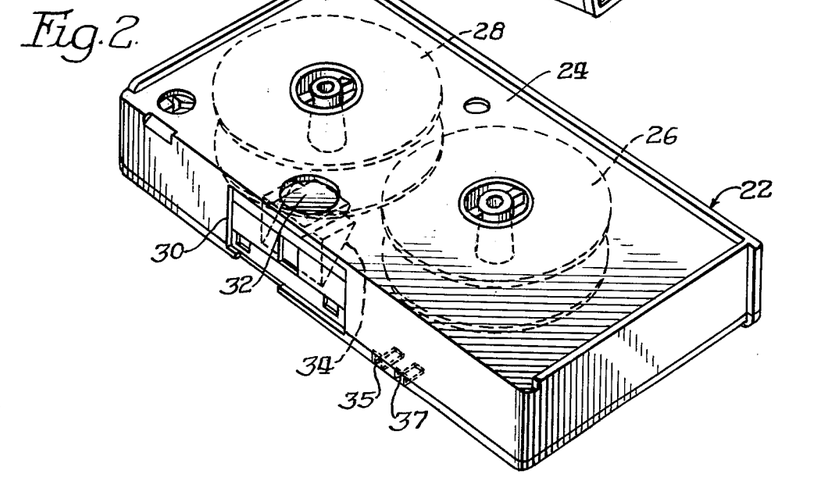
FIG. 2 is an isometric view of a rapid-process film cassette.

Referring to FIGS. 1 and 2, processor/projector unit 20 and rapid-process type motion picture film cassette 22 are shown in generalized form.

The cassette 22 includes a casing 24, an internal rotatably-mounted supply reel 26, an internal rotatably-mounted take-up reel 28, and a film gate 30. As previously indicated, the film maintained on the supply and take-up reels in the cassette 22 is intended to be exposed, processed, projected, and stored without being removed from the cassette. For film processing purposes, the cassette is provided internally with a rupturable pod or container (not shown) containing processing fluid and an applicator (not shown) for applying the processing fluid to the film as the film is driven from the take-up reel 28 to the supply reel 26. In order to project processed film, the projection light beam is directed through an aperture 32 in the cassette and reflected by a prism 34 within the cassette through the film gate 30 to the projector objective lens systems for imaging on a viewing screen. For the purpose of indicating whether the film in the cassette 22 is processed or unprocessed, the cassette 22 is provided with a suitable indicating means in the form of a suitable internal electrical connection (not shown) between two external electrical contacts 35 and 37 on the casing of the cassette 22. The internal electrical connection between contacts 35 and 37 is broken when the film is first rewound back onto the supply reel. The existence of an electrical continuity between contacts 35 and 37 indicates an unprocessed film while an electrical discontinuity between contacts 35 and 37 indicates a processed film. As described in detail hereinafter, the control system of the present invention includes an operating cycle selector which is responsive to the cassette film condition indicating means to condition the control system for either a processed-film operating cycle or an unprocessed-film operating cycle.

The processor/projector unit 20 is adapted to receive the cassette 22 in a compatibly configured slot or recess 36 for processing and projection purposes. The particular processor/projector unit 20 shown includes a projection lighting and optics (not shown) and a viewing screen 40. A conventional mechanical shuttle system (not shown) is provided in the processor/projector unit for driving the film during projection. In addition, a suitable drive system is provided for driving the cassette take-up reel 28 during shuttle advance of the film in projection direction from the supply reel 26 to the take-up reel 28, and for driving the supply reel 26 to transport the film in the rewind direction from the take-up reel 28 to the supply reel 26. One form of drive system suitable for this purpose is shown in the copending application of Kenyon A. Hapke, Ser. No. 319,828, filed Dec. 29, 1972, entitled Drive System.

Figure 4:
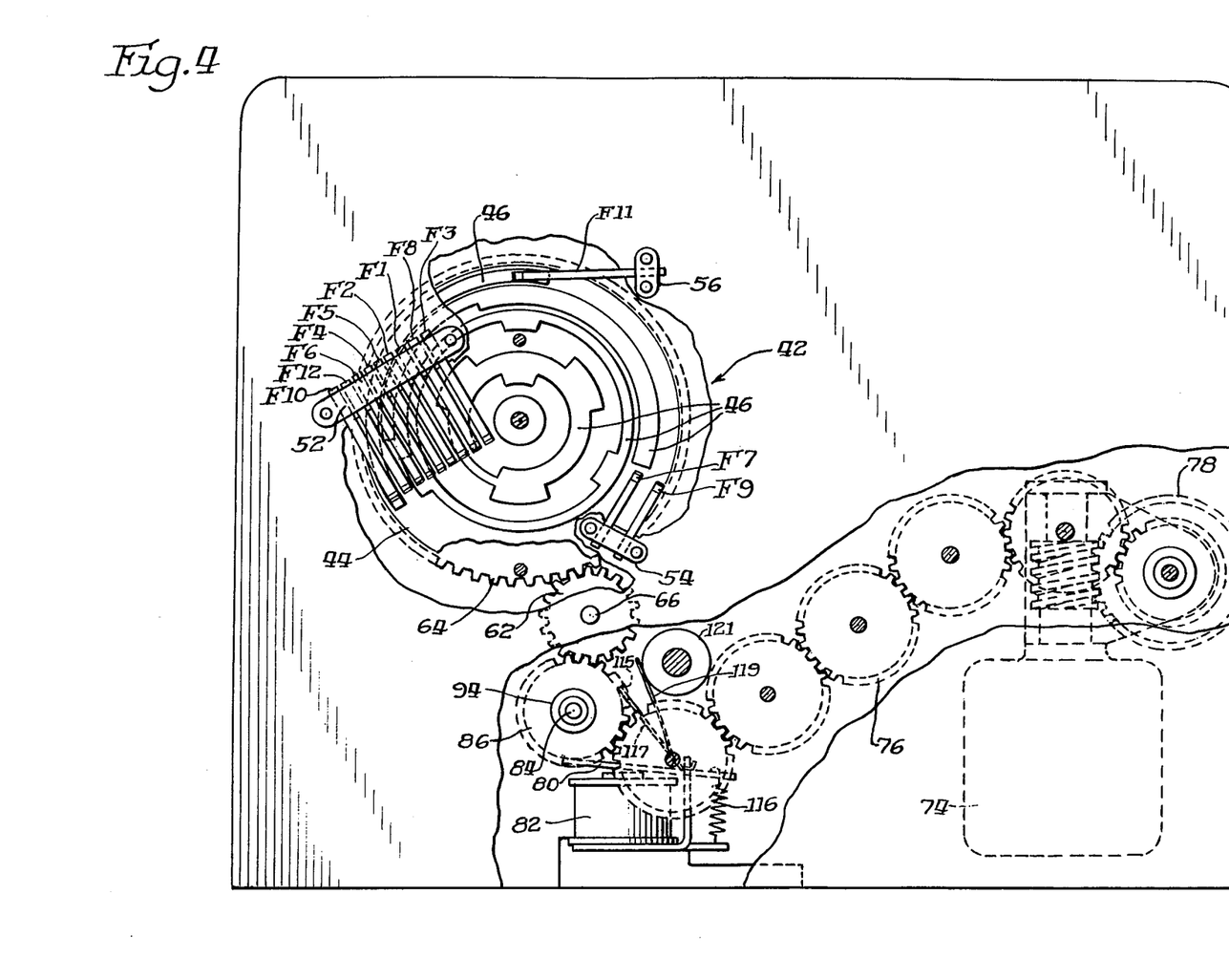
FIG. 4 is a front view in elevation of the logic disc and its associated drive assembly and electrical contact assemblies.
Figure 5:
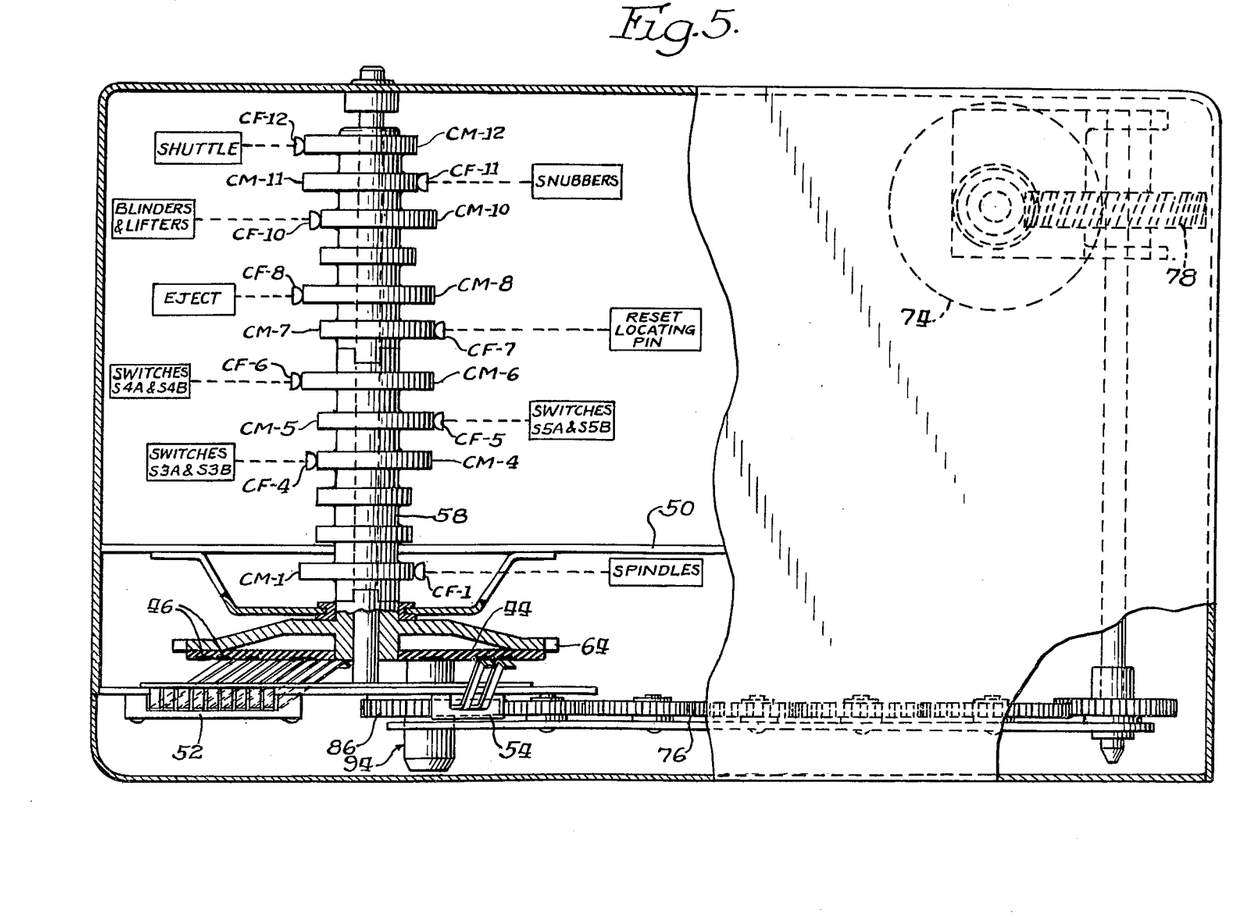
FIG. 5 is a top view partly in elevation and partly diagrammatic of the logic disc and its associated drive assembly, cam shaft assembly, and electrical contact assemblies.

The control system of the present invention includes a function programmer which comprises (1) an operating cycle selector for programming the processor/projector for either a processed-film cycle or an unprocessed-film cycle and (2) a logic unit for programming the sequence and execution of the plural operating modes of the processor/projector during an operating cycle. The operating cycle selector comprises the relay K1 and its associated contacts and circuitry shown in the control circuit schematic of FIG. 3. The logic comprises the logic disc assembly 42 shown in FIGS. 4 and 5 and its associated circuitry in the control circuit schematic of FIG. 3.

THE LOGIC DISC ASSEMBLY

The logic disc assembly 42 comprises a rotatable logic disc 44 which is provided on its face with a concentric set of plural electrical contact rings 46. A cooperating set of stationary electrical wiper contact fingers F1 through F12 are fixedly mounted at one end and arranged in three angularly-spaced assemblies 52, 54, and 56. The wiper contact fingers F1 through F12 are each arranged and oriented to bear resiliently against the face of the disc 44 and to cooperate with one of the contact rings 46 of the disc 44 to make or break an electrical continuity as determined by the configuration of the associated contact ring and the rotational position of the disc 44.

The logic disc assembly 42 further includes a rotatable cam shaft 58 which is keyed to the logic disc 44 for rotation therewith. The cam shaft 58 is provided with a set of twelve cams CM1 through CM12. Each of the cams CM1 through CM12 is configured and provided with a cam follower (CF1 through CF12) to open and close a switch or to activate and deactivate a mechanical function as diagrammatically set forth in FIG. 5 and as more particularly referred to hereinafter.

Figures 6, 7, 8:
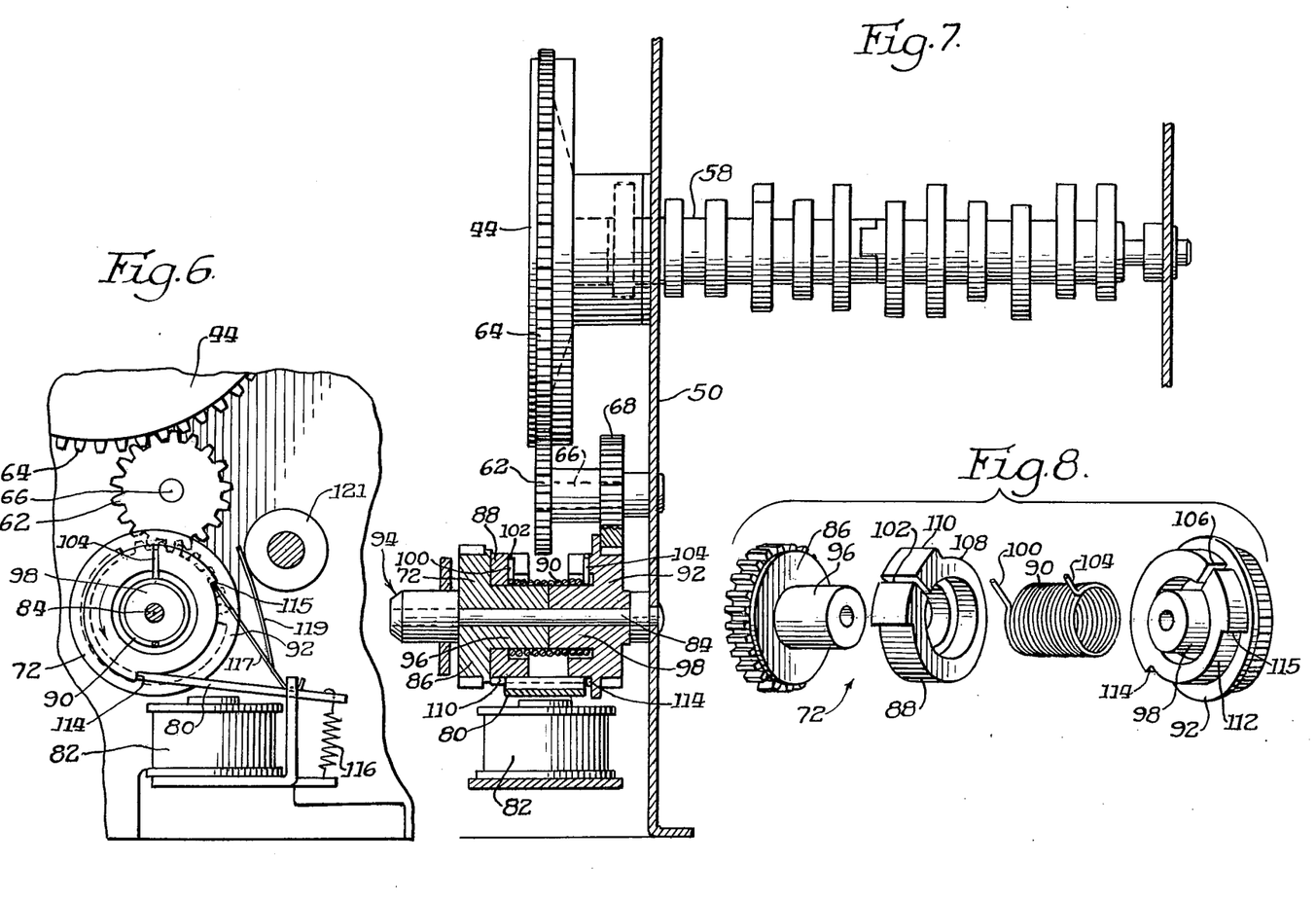
FIG. 6 is an enlarged front view in elevation of the logic disc clutch assembly.
FIG. 7 is a side view partly in elevation and partly in cross section of the logic disc clutch assembly.
FIG. 8 is an exploded view of a portion of the logic disc clutch assembly.
Figure 9:
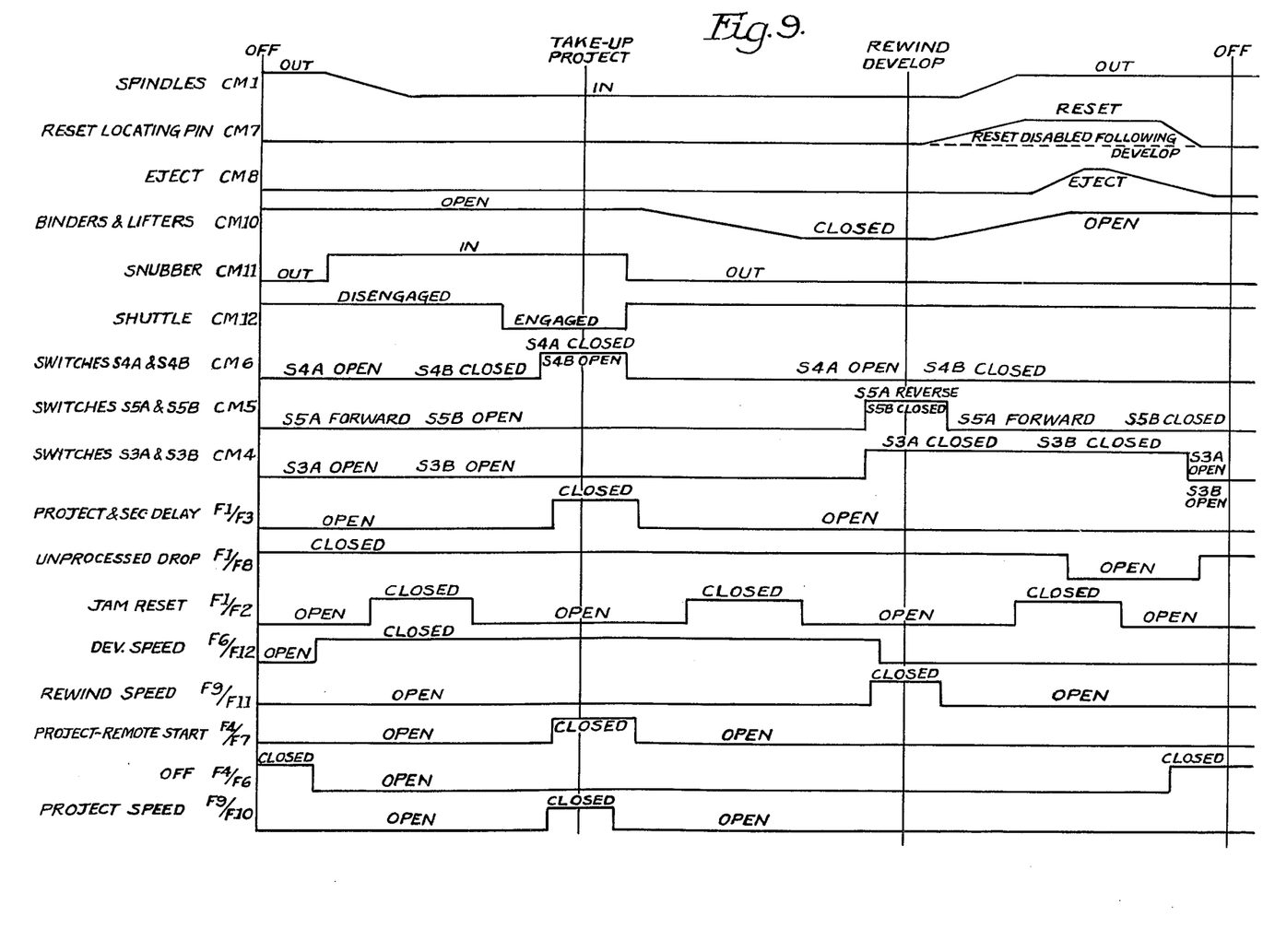
FIG. 9 is a chart of a sequencing of functions in accordance with the present invention.

As illustrated in FIGS. 6 and 7, the logic disc 44 and cam shaft 58 are driven by a gear 62. For this purpose, the circumferential periphery of the logic disc 44 is provided with gear teeth meshed with the driving gear 62. The shaft 66 provides a pivot for driving gear 62, which is an integral part of gear 68. Gear 68 engages with the output gear 92 of a logic clutch 72. The logic clutch 72, in turn, is driven by the processor/projector AC drive motor 74 through a suitable transmission and motor output worm gearing 78.

The logic clutch 72 is controlled by a control pawl 80 which, in turn, is controlled by energization and deenergization of an electromagnet coil 82 in the manner hereinafter described in relation to the circuit schematic of FIG. 3.

The structure of the logic clutch 72 is best shown in FIGS. 6 through 8. The logic clutch 72 is a spring-wrapped clutch comprising a supporting shaft 84 secured to the frame 50, an input drive gear 86, an input clutch disc 88, a helical torsion spring 90, and an output drive gear 92. The assembled logic clutch 72 is positioned and retained on the supporting shaft 84 by a retainer collar 94 which is secured to the free end of the shaft 84. The input drive gear 86 and the output drive gear 92 are both rotatably mounted on the shaft 84, and the input clutch disc 88 is rotatably mounted on the input drive gear 86. The helical spring is wrapped about cylindrical abutting portions 96 and 98 of the input drive gear 86 and output drive gear 92, respectively, and is fabricated to have an at rest unexpanded internal diameter less than the outside diameter of the cylindrical portions 96 and 98. One end 100 of the helical spring 90 is secured in a slot 102 provided in the input clutch disc 88, and the opposite end 104 of the torsion spring 90 is secured in a slot 106 of the output drive disc 92. The clutch disc 88 is provided with a detent channel 108 arcuately extending the majority of its circumferential periphery and forming a detent stop 110 at one end. The output drive disc is provided with a similar detent channel 112 arcuately extending for approximately 120° of the circumferential periphery of the output drive disc 92 and forming a detent stop 114 at one end and another opposingly faced detent stop 115 at the other end. The control pawl 80 has a width, as shown in FIG. 7, sufficient to engage both the detent stop 110 of the clutch disc 88 and the detent stop 114 of the output drive disc 92. As depicted in FIG. 6, the pawl 80 is pivotally supported and biased by a tension spring 116 to a normally-engaged position. An anti-reverse pawl 117 is also provided and, as depicted in FIG. 6, is biased to normally engage the detent 115 by the spring action of an integral leaf member 119 bearing resiliently against a stationary post 121.

When the control pawl 80 is momentarily disengaged from the detent stops 110 and 114 by energizing the magnet coil 82, the helical spring 90 grips the cylindrical portions 96 and 98, effecting transmission of torque from the input drive gear 86 to the output drive gear 92. De-energizing the magnet coil 82 releases the control pawl 80 to engage the detent stop 110 as the input clutch disc completes one revolution. When the detent stop 110 strikes the pawl 80, the spring 90 begins to unwind causing a slight diametrical clearance between the spring 90 and the cylindrical portions 96 and 98 with the result that transmission of torque from the input drive gear 86 to the output drive gear 92 terminates. A slight overtravel of the output drive gear 92 permits the anti-reverse pawl to engage the detent stop 115 just before the detent stop 114 strikes the control pawl 80. Hence, the output drive gear 92 is positively latched in position against forward or reverse rotation until the magnet coil 82 is again momentarily energized. The gear ratio between the logic disc 44 and the clutch output drive disc gear 70 is three-to-one with the result that a momentary energization of the electromagnet coil 82 will effect an angular rotation of the logic disc of 120°.

Each 120° detent or stop position of the logic disc assembly 42 represents a different logic state of the logic disc assembly. As described in greater detail hereinafter, the three logic states or positions of the logic disc assembly 42 are off, take-up/project, and develop/rewind. When the control system is programmed for an unprocessed-film operating cycle by the operating cycle selector, the system will command a take-up mode when the logic disc assembly is advanced to its take-up/project position followed by a develop mode when the logic disc assembly is advanced to its develop/rewind position. The logic disc assembly will then be advanced past its off position to its take-up/project position again, this time to command a mandatory project mode and then advanced to its develop/rewind position to command a rewind mode. The undeveloped-film operating cycle is completed when the logic disc assembly 42 is advanced to its off position.

When the control system is programmed for a processed-film operating cycle, the take-up and develop modes will not be performed, and the logic disc assembly 42 will sequence the system to project mode, to rewind mode, to off mode.

THE CONTROL CIRCUIT

Figure 3:
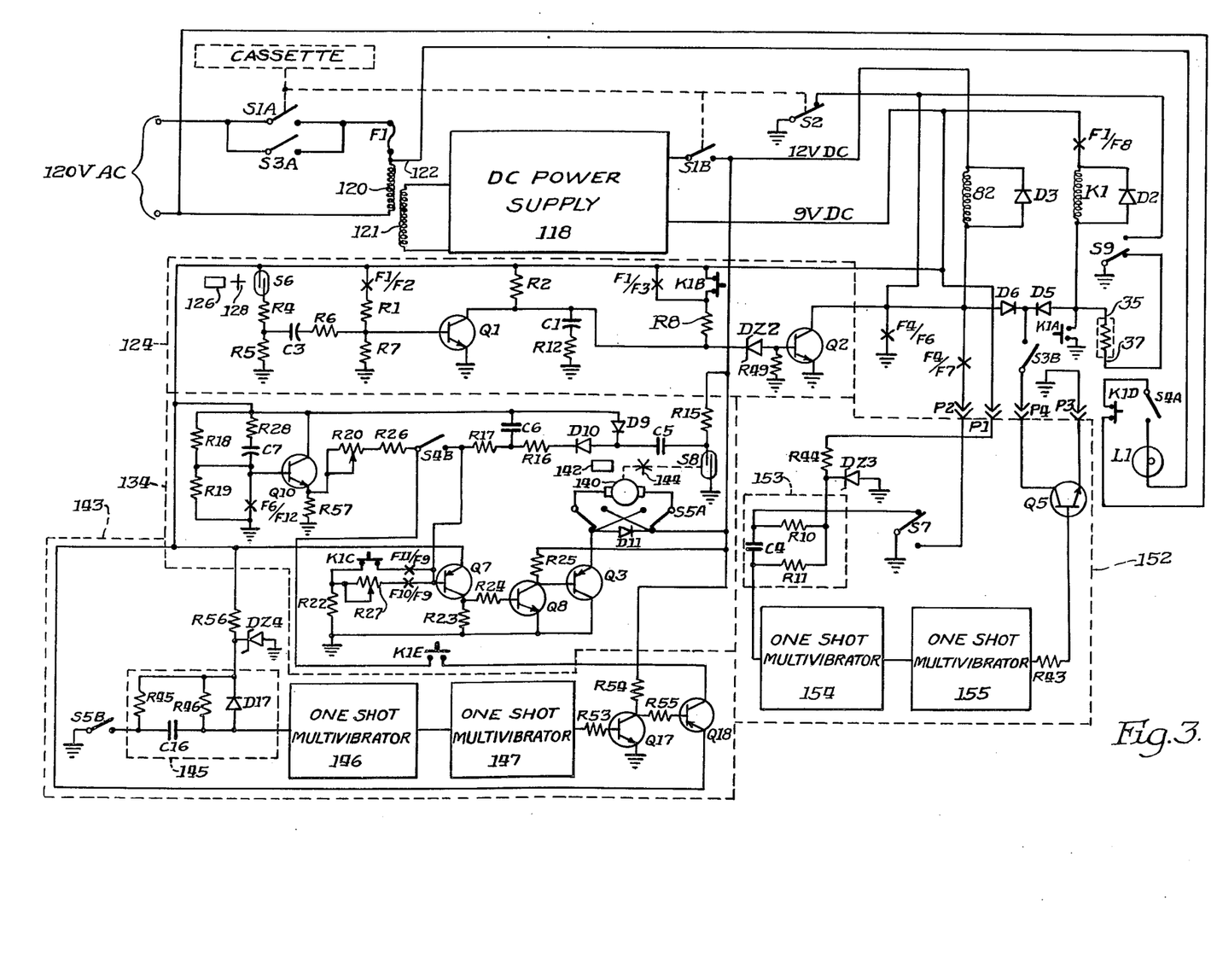
FIG. 3 is a schematic diagram of the electrical circuitry in the system of the present invention.

Considering now the control circuit schematic of FIG. 3, energization is provided by a 120 volt AC input adapted to be connected across coil 120 via switch fuse F1 and either or both switches S1A and S3A. The coil 120 serves both as an AC motor-former coil for the processor/projector AC drive motor and as the primary of a power transformer having a secondary winding 121. A tap 122 also provides a 20.5 volt AC supply for the projection lighting L1. The secondary coil 121 forms the input for a DC power supply 118 which provides output voltage of 12 and 9 volts DC.

1. The Operating Cycle Selector

To program the control system for either an unprocessed-film operating cycle or a processed-film operating cycle, the control circuit includes a relay K1 connected across the 9 volt supply in series with logic disc contacts F1/F8, processed/unprocessed film sensor contacts 35 and 37, and switch S9. The embodiment shown is adapted to be used with a cassette having external film condition indicator contacts 35 and 37 (FIG. 2) which present an electrical continuity when the film is unprocessed and an electrical discontinuity when the film has been processed. Other suitable forms of cassette film condition indicators could also be used — to mechanically close a switch, for example. The insertion of an unprocessed cassette energizes the relay K1 to actuate its various contacts (each herein denoted by the preface reference characters "K1") to program the control circuit for an unprocessed-film cycle. The processor/projector unit is otherwise normally programmed for a processed-film cycle.

2. The Mode Change Actuator Circuit

The control circuit further comprises a mode change actuator circuit 124 for energizing the logic clutch magnet coil 82 to advance the logic unit in response to a cessation of film movement incident to the completion of an operational mode of the processor/projector apparatus.

The mode change actuator circuit 124 comprises a reed switch S6 which is positioned in, and maintained normally closed by, the field of a magnet 126. A bladed wheel 128 is suitably attached to the take-up reel drive (not shown) for rotation therewith. So long as the take-up reel 28 is rotating (indicating a movement of film), the blades of the wheel 128 repeatedly break the magnetic flux path to the reed switch S6 as they pass between the reed switch S6 and the magnet 126. The reed switch S6 momentarily opens with each interruption of the flux path, thereby producing a pulsed voltage signal across the resistor R5 of the voltage divider network formed by resistors R4 and R5. The pulsating component of the voltage signal across R5 is passed by the coupling capacitor C3 and resistor R6, and the resultant positive pulsating voltage developed across the resistor R7 is effective to repeatedly forward bias the base-emitter junction of the NPN transistor Q1 causing a collector-emitter current flow through transistor Q1.

The collector-emitter circuit of the transistor Q1 is connected across capacitor C1 and resistor R12. The resistors R2 and R8 form time delay charging current paths for the capacitor C1. However, the collector current flow through transistor Q1 produced during take-up reel rotation is sufficient to maintain capacitor C1 discharged to a low level. Hence, so long as the transistor Q1 continues to draw collector current pulses as a result of continuing take-up reel rotation, capacitor C1 is prevented from being charged to a significant voltage level through either of the time delay charging resistors R2 and R8. However, when the take-up reel stops rotating incident to the end of a run (or a film jam), the capacitor C1 is permitted to charge along an RC charging curve toward the 9 volt supply voltage level.

The mode change circuit includes an NPN driver transistor Q2 in common emitter circuit configuration with its base connected through a zener diode DZ2 to the capacitor C1 and its collector connected through the logic clutch magnet coil 82 to the 12 volt supply. The zener diode DZ2 has a predetermined breakdown level. Accordingly, when the charge on capacitor C1 incident to cessation of rotation of the take-up reel exceeds the breakdown level of the zener diode DZ2, the base-emitter junction of the transistor Q2 is forward biased, permitting current flow through the collector-emitter circuit and energizing the logic clutch magnet coil 82 to rotate the logic disc assembly 42 to its next logic state. Upon each rotation of the logic disc, the momentary closure of contacts F1/F2 biases Q1 into conduction thereby discharging C1, in turn interrupting current flow through Q2 and de-energizing the logic clutch magnet coil 82.

The mode change actuator circuit is also described in the application of John P. Bagby, et al., entitled Mode Change Actuator, filed concurrently herewith and assigned to the same assignee.

3. The Reel Drive Control Circuit

The control circuit further comprises a reel drive motor control circuit 134 for controlling the speed and direction of the reel drive motor 140 during the several operational modes of the processor/projector. The motor 140 is a reversible DC motor coupled to the cassette supply and take-up reels 26 and 28 through a suitable transmission (not shown) such as described in the aforementioned copending application of Kenyon A. Hapke, Ser. No. 319,829.

During the develop mode, the exposed film is driven from the take-up reel 28 to the supply reel 26 by the action of the motor 140 driving the supply reel 26. In order to insure a uniform application of development fluid to the film during this period of time, it may be desirable to drive the film a constant lineal speed past the processing fluid applicator. To achieve a constant lineal film speed, the DC motor should drive the supply reel at a progressively decreasing rate in order to compensate for increasing convolution diameter as film is wound onto the supply reel. Accordingly, the motor control circuit 134 includes a capacitor discharge circuit comprising capacitor C7 and resistors R18, R19, and R28 for providing a non-linear, gradually-decreasing motor speed forcing function reference. The logic disc contacts F6/F12 are closed except during the develop mode. Hence, the capacitor C7 is normally charged to the 9 volt supply level. However, during the develop mode, the contacts F6/F12 open to forward bias the base-emitter junction of the NPN transistor Q10. The transistor Q10 functions as an emitter-follower current amplifier. As the capacitor C7 exponentially discharges, the base-emitter current flow through Q10 exponentially increases causing a corresponding exponentially-increasing collector-emitter current flow through the emitter resistor R57 producing an exponentially-increasing voltage across the emitter resistor R57.

The motor 140 negative-feedback signal is generated by an arrangement similar to that used for generating the pulsating voltage input signal for the mode change actuator 124. Specifically, a reed switch S8 is positioned in the field of a magnet 142, and a five-bladed wheel 144 driven by the motor 140 is positioned to repeatedly interrupt and shunt the flux path to the reed switch S8 thereby repeatedly opening and closing the reed switch S8. The reed switch S8 is connected in series with resistor R15 between ground and the 12 volt supply voltage thereby generating a pulsating square-wave voltage signal which varies in frequency as a direct function of the speed of the reel drive motor 140. The circuit comprising capacitors C5 and C6, diodes D9 and D10, and resistors R16 and R17 serves as a voltage doubling circuit the output of which is applied to the base of the PNP transistor Q7 as a pulsating positive-voltage signal having a pulsation frequency proportional to the rotational speed of the motor 140. The peaks of the pulses are sufficiently positive to repeatedly back-bias the base-emitter junction of the transistor Q7 on each pulse. Hence, the motor speed feedback circuit effectively applies a negative-feedback motor speed signal to the base of transistor Q7 which turns the transistor Q7 off and on at a frequency proportional to motor speed.

It should be noted at this juncture that the base of the transistor Q7 serves as the summing point input of a three-stage motor current control amplifier which further comprises the NPN transistor Q8 and the PNP transistor Q3, together with the biasing resistors R23, R24, and R25. The three-stage amplifier is biased to normally control at a maximum motor speed level, i.e., the transistor Q3 is normally biased for maximum motor current flow through its collector-emitter circuit. However, as previously noted, the pulsating motor speed feedback signal serves as a negative-feedback signal which repeatedly back-biases the base-emitter junction of the transistor Q7 thereby turning the normally conductive transistor Q7 off and on at a rate proportional to motor speed thereby causing the amplifier to control at an equilibrium level at which the mean motor current magnitude is less than the maximum motor current level. Hence, the motor control system functions as a closed-loop control system.

During the develop mode, the switch S4B is closed, and the logic disc contacts F9/F11 are closed, but the relay contacts K1C and the logic disc contacts F9/F10 are open. Accordingly, the exponential motor speed reference circuit is effective to present at the base of transistor Q7 via coupling resistors R20 and R26 and emitter resistor R57 an impedance which gradually increases at an exponential rate as the capacitor C7 is discharged thereby modulating the input to the control amplifier at the base of the transistor Q7 to cause the speed of the motor to gradually decrease at a non-linear exponential rate which is correlated to the increasing diameter of the outer film convolution as film is progressively wound onto the driven film reel such that the lineal film speed is maintained constant.

A further aspect of the develop mode motor control is a 3½ second subcycle provided at the outset of the develop mode by a subcycle circuit 143 comprising a pulse former circuit 145 and a pair of conventional one-shot multivibrator circuits 146 and 147 in series. The first one-shot multivibrator 146 has a ½ second unstable period, and the second one-shot multivibrator 147 has a 3 second unstable period. The pulse former circuit 145 comprises the capacitor C16, resistors R45 and R46, and the diode D17. At the beginning of the develop mode, the cam operated switch S5B is closed causing the capacitor C16 to begin charging to form a negative pulse at the input to the one-shot multivibrator 146. This initiates the ½ second unstable period of the multivibrator 146. Accordingly, the multivibrator 146 delivers a positive pulse of ½ second duration to the multivibrator 147. The negative-going trailing edge of the ½ second pulse initiates the 3 second unstable period of the multivibrator 147, and the multivibrator 147 delivers a positive pulse of 3 seconds duration to a two-stage amplifier comprising the NPN transistor Q17, resistors R53, R54, and R55, and PNP transistor Q18. The two-stage amplifier, in turn, delivers the 3 second positive pulse through relay contact K1E to the base of the transistor Q7 and forces the motor 140 to stop for 3 seconds. This timing combination permits the motor to run for ½ second and stop for 3 seconds at the outset of the develop mode. This permits rupturing of the development fluid pod in the cassette during the ½ second period followed by a 3 second delay period for the development fluid to saturate the applicator wick inside the cassette. This sequence of ½ second run followed by 3 seconds off is provided only at the outset of the develop mode. During the rewind mode, the relay contacts K1E are open.

During the rewind mode, the discharge capacitor C7 again functions to force the motor speed to follow an exponentially-decreasing speed curve. However, because both the relay contacts K1C and logic disc contacts F9/F11 are closed during the rewind mode, the resistor R22 is inserted in parallel with the R57, R20, and R26 resistance network with the result that the overall impedance level presented at the base of the transistor Q7 is appreciably lower during the rewind mode than during the develop mode thereby resulting in a higher overall speed level for the motor 140 during rewind than during develop. During the take-up and project modes, the motor 140 is driven in the forward direction with the switch S4B and logic disc contacts F9/F11 open, removing the exponential forcing function circuitry from control, and the logic disc contacts F9/F10 closed, inserting the resistors R22 and R27 across the base of the transistor Q7 and ground to serve as a constant reference or forcing function by presenting a constant impedance at the base of the amplifier input transistor Q7. Accordingly, the feedback motor control amplifier maintains the motor speed constant during the take-up and project modes.

4. The Remote Control Replay Circuit

The control circuit also provides a remote control replay circuit 152 which is coupled to the main circuitry by plug contacts P1, P2, P3, and P4. The remote control replay circuit comprises a manually-depressed spring-biased switch S7, a pulse former circuit 153, two one-shot multivibrators 154 and 155 in series, and an output amplifier consisting of coupling resistor R43 and PNP transistor Q5. As will be described hereinafter, depressing the switch S7 results in rewind of a length of film for projection replay.

OPERATION

The insertion of a properly oriented cassette into the receiving slot 36 of the processor/projector closes switches S1A and S1B and opens a separate safety switch S2. A suitable cassette latching mechanism and means for effecting the closure of the switches S1A and S1B and opening of switch S2 is disclosed in copending application of Kenyon A. Hapke, et al., filed concurrently herewith and entitled Film Cassette Sensing and Retaining Unit. The closure of switch S1A connects the line power to the transformer/motor former coil 120. This energizes the processor/projector AC drive motor, provides a step-down AC lamp voltage of 20.5 volts via winding tap 122, and energizes the DC power supply to provide DC supply voltages of 9 and 12 volts.

The switch S2 is a normally closed safety switch to prevent false starts of the processor/projector as might be occasioned by improperly inserting an object other than a properly oriented cassette into the processor/projector slot 36. In the event that switches S1A and S1B are closed in such a manner without coincident opening of the normally closed switch S2, the switch S2 and logic disc contacts F4/F5 provide an electrical ground return path for the logic disc clutch magnet coil 82 in the project and rewind modes which will serve to prevent the logic disc from stopping in either the take-up project or the develop rewind positions. The logic disc will advance to its off position causing actuation of a cassette ejection mechanism and causing the power contacts S1A and S1B to open.

1. Unprocessed Film Cycle

The operation of the control system can be best understood by considering first the unprocessed film cycle. When a cassette containing exposed but undeveloped film is inserted into the processor/projector, an electrical continuity exists between contacts 35 and 37 providing a ground return path to energize the unprocessed-film cycle programming relay coil K1. As soon as relay coil K1 is energized, the relay contacts K1A close to form a self-latching ground return circuit to retain the relay K1 in its energized state.

The logic disc clutch magnet coil 82 is energized upon closure of the power switch S1B through a ground return path completed by logic disc contacts F4/F6. Energization of the logic disc clutch magnet coil 82 causes a one-third revolution of the logic disc 44, taking the logic disc out of its off position and causing rotation of the logic disc 44 toward its take-up/project position to initiate a take-up operational mode to wind-up onto the cassette take-up reel any remaining unexposed film.

a. Take-up Mode Conditioning and Actuation

As the logic disc 44 rotates toward its take-up project position, the logic disc contacts F4/F6 are opened to release the stop pawl 80 permitting the pawl to engage the detent stops 110 and 114 thereby stopping rotation of the logic disc in its take-up/project position after 120° of rotation. In addition, the logic disc contacts F1/F2 close to provide jam circuit reset action by forward biasing the base-emitter junction of transistor Q1 to discharge the capacitor C1 to a very low level. The logic disc contacts F1/F3 close to condition the mode change circuit for 3 second delay actuation. The contacts F9/F10 in the motor control amplifier circuit are closed in preparation for project operation.

In addition, the following logic disc cam shaft actuation events occur during this transit period between the logic disc off position and take-up/project position. Cam CM1 actuates a drive spindle engagement mechanism (not shown) to engage the supply and take-up reels of the cassette with the processor/projector drive mechanism. A suitable form of spindle engagement mechanism is disclosed in the copending application of Raymond E. Clever et al., entitled Drive Interface System, filed concurrently herewith and assigned to the same assignee. CM6 closes the projection lamp power switch S4A. However, the projection lamp remains de-energized since the normally closed relay contacts K1D are open because of the energization of programming relay K1. Cam CM11 actuates a snubber control mechanism (not shown) for locking a snubber roller in the cassette for take-up/project operation. A suitable form of snubber control mechanism is disclosed in the copending application of Kenyon A. Hapke, et al., entitled Film Snubbing Control System, filed concurrently herewith and assigned to the same assignee. CM12 releases a suitable shuttle holdback mechanism (not shown) to permit projection shuttle to engage the film in the cassette.

When the logic disc 82 stops in its take-up/project position, the processor/projector is conditioned to execute the undeveloped-film cycle take-up mode of operation and begins winding up onto the take-up reel any remaining unexposed film. The operational time period extended in this mode will depend on the amount of unexposed film in the cassette. The operational functions during the take-up mode are as follows.

The film shuttle transports the film away from the supply reel at a film rate of 18 frames per second. The projection lamp is off by virtue of the fact that the normally-closed relay contacts K1D have been opened by energization of the programming relay K1. The cassette take-up reel 28 is driven by the DC motor 140 to wind up the slack film provided with each cycle of the film shuttle. For this purpose, the take-up reel drive is provided with a suitable slip clutch such as shown in the aforementioned application of Kenyon A. Hapke, Ser. No. 319,829. The slip clutch preferably slips at about 1.25 inch ounces of torque with an input feed of about 100 r.p.m. Preferably there is a feed reduction of 15 to 1 between the motor 140 and the take-up reel 28. Consequently, during the take-up mode, the motor control circuit 134 is programmed to control the speed of the motor 140 at the requisite constant 1500 r.p.m. speed. The normally-closed relay contacts K1C are open as a result of energization of the programming relay K1. The logic disc contacts F9/F11 are also open. However, the logic disc contacts F9/F10 are closed, and the switch S4B is open. Hence, the motor control circuit functions to maintain constant speed control of the motor 140 in the manner previously described.

Near the end of the film on the supply reel, the film shuttle encounters an opening extending three perforations in length and film transport in projection direction terminates. This results in a stationary take-up spindle condition referred to as an end-of-film condition, bringing the mode change actuator 124 into operation. In the mode change actuator circuit, the reset contacts F1/F2 which had closed momentarily during the transit period from logic disc off position to its take-up/project position are now open while the logic disc contacts F1/F3 are closed forming a path for application of 9 volt supply voltage to charge the capacitor C1 through resistor R8 in parallel with R2. Since the wheel 128 is stationary, reed switch S6 no longer generates pulsed signals, and the transistor Q1 no longer conducts to maintain the capacitor C1 discharged. Accordingly, the capacitor C1 begins to charge along an exponential curve determined by the RC network comprising parallel resistors R2 and R8, charging capacitor C1, and series resistor R12. A delay of approximately 3 seconds occurs until the capacitor C1 reaches a charging level sufficient to break down the zener diode DZ2 and render the mode change actuator output transistor Q2 conductive. This 3 second delay is provided as a safeguard against a false mode change signal. When transistor Q2 conducts, clutch magnet coil 82 is again energized to step the logic disc 120° to its develop/rewind position.

b. Develop Mode Conditioning and Actuation

During the transit period as the logic disc rotates from its take-up/project position to its develop/rewind position, the following events occur. The logic disc contacts F1/F3 in the mode change circuit open, and the logic disc reset contact F1/F2 close to discharge the capacitor C1, de-energizing the logic disc clutch magnet coil 82 and thereby releasing the stop pawl to stop the logic disc when it reaches its develop/rewind position. In addition, the logic disc contacts F9/F10 and F6/F12 in the motor control circuit are open as are the relay contacts K1C. Accordingly, the capacitor C7 is conditioned to begin an exponential discharge to establish an exponential reference signal which the motor control circuit 134 is effective to force the motor speed to follow.

The logic disc cam shaft is effective during the transit period between take-up/project position and develop/rewind position to produce the following events. The cam CM5 reverses the power polarity to the DC motor to drive it in a clockwise direction for film rewind by switching a double-pole-double-throw ganged switch S5A. A diode D11 connected across the motor switch S5A functions as a transient suppressor preventing inductive kick from the motor armature winding from damaging Q3. The cam CM5 also closes a switch S5B to trigger the subcycle circuit 143.

The cam CM6 is operative to open the projection lamp switch S4A. The cam CM6 also closes the switch S4B in the motor control circuit to connect the amplifier transistor Q7 to the exponential speed reference circuitry. Cam CM10 actuates a cassette blinder and pressure plate lifting mechanisms (not shown) to prevent external light from entering the cassette chamber and to lift the pressure plate within the cassette away from the film to minimize friction on the film during the develop mode. Suitable forms of blinder and pressure plate lifting mechanism are shown in the applications entitled Film Cassette Sensing and Retaining Unit, by John P. Bagby, et al., and Film Cassette Conditioning Mechanism, by Kenyon A. Hapke, et al., both filed concurrently herewith and assigned to the same assignee.

Cam CM11 is effective to release the snubber within the cassette so that the film can be advanced smoothly from the take-up reel to the supply reel. Cam CM12 actuates the mechanism (not shown) for retracting the shuttle to disengage the shuttle teeth from the film perforations.

Upon completion of the transit period of the logic disc between its take-up/project position and its develop/rewind position, the following functions occur. The drive motor 140 begins to rotate to advance film from take-up reel to the supply reel. The subcycle circuit 143 is effective to permit an initial ½ second of motor rotation before delivering a 3 second motor stop pulse to the base of transistor Q7 via closed relay contacts K1E. During the first ½ second of film movement, the motor advances approximately 8 inches of film during which time the development fluid pod is ruptured. During the following 3 seconds of motor stop the development fluid applicator wick is saturated. At the completion of this 3½ second subcycle period, the motor speeds up to about 2500 r.p.m. to advance the remaining approximately 50 feet of film at a constant lineal speed of 20 inches per second as controlled by the feedback motor control circuit controlling along an exponentially-decreasing speed reference curve generated by discharge of the capacitor C7. As the film advances from take-up reel to the supply reel, the constant speed of 20 inches per second, a uniform application of development fluid to the film emulsion is effected by the applicator wick within the cassette. The speed of the motor 140 eventually decreases to about 1000 r.p.m. near the end of the film advance to the supply reel. At the end of the film, the electrical continuity between film condition indicator contacts 35 and 37 is broken.

During the 30 second period of time required to advance the entire 50 feet of film from the take-up reel to the supply reel, the mode change reed switch S6 provides a pulses output which maintains the capacitor C1 effectively discharged. However, when the film reaches its end at the take-up reel, the take-up spindle stalls, and the mode change circuit 124 reacts by causing a discontinuance of pulses from the reed switch S6 permitting the capacitor C1 to begin charging. It should be noted that since neither the logic disc contacts F1/F3 nor the relay contacts K1B are closed at this time, the sole charging path for the capacitor C1 is the resistor R2. The time constant of the RC network comprising the resistor R2, capacitor C1, and resistor R12 is such that the capacitor C1 does not charge to the level necessary to break down the zener diode DZ2 until the passage of 10 seconds. This 10 second delay provides sufficient time for the development fluid to react chemically with the film emulsion on the last few feet of film. Upon breakdown of the zener diode DZ2, the mode change driver output transistor Q2 is forward biased into conduction, energizing the logic disc clutch magnet coil 82 to begin rotation of the logic disc toward its off position.

c. Project Mode Conditioning and Actuation

During the transit period of the logic disc 44 between the develop/rewind position and its off position, the following events occur. Logic disc reset contacts F1/F2 close to discharge the capacitor C1 releasing the stop pawl 80. The logic disc contacts F1/F8 in the programming relay K1 circuit open and close again during the transit period to de-energize the programming relay K1. When these disc contacts close and re-establish connection of the relay K1 to the 9 volt supply, the relay remains unenergized because the relay latching contacts K1A have opened, and no other ground return path exists for current flow through the relay coil K1. In addition, logic disc contacts F4/F6 close to provide a ground return path for the electromagnet clutch coil 82. As described further on, this prevents termination of system operation when the logic disc reaches its off position.

The cam CM1 actuates retraction of the engagement of the processor/projector drive mechanism with the cassette supply and take-up reels. The cam CM4 opens switch S3A. However, switch S1A remains closed maintaining the connection to the AC power line closed. Cam CM5 actuates the motor switch S5A to condition the motor for project operation. Cam CM5 also opens the switch S5B to the subcycle circuit 143 to prepare that circuit for operation to provide a 3½ second sequenced motor control pulse as previously described when next the switch S5B is closed. Cam CM7 attempts to actuate the linkage to release the cassette latching mechanism. However, when the relay K1 is energized, the disengaging linkage for the cassette latching mechanism is disabled, and the sequence timing is such that the cam CM7 release of the latching mechanism occurs in the transit period between develop/rewind position and off position at a point prior to the de-energization of the K1 relay. Therefore, following the develop mode, the cassette latching mechanism is not released and the switch S1A remains closed. Cam CM8 actuates a cassette eject mechanism and exerts forces on the cassette in an attempt to eject the cassette from the slot 36. However, since the cassette latching mechanism has not been released, the cassette will not be ejected following the develop mode. A suitable mechanism for disabling the cassette disengaging linkage while the relay K1 is energized is disclosed in the aforementioned application of John P. Bagby, et al., entitled Film Cassette Sensing and Retaining Unit, filed concurrently herewith. Cam CM10 is effective to actuate a retraction of the blinders which are used to preclude entry of light into the cassette during the develop mode. Cam CM10 also effects the release of the lifter mechanism which maintained the cassette pressure plate lifted off the film during the develop mode.

As indicated, although the logic disc 44 rotates to its off position, the cassette does not eject, and the clutch magnet coil 82 is again energized by the continued closure of switches S1A and S1B and the closure of contacts F4/F6 causing the logic disc to advance to its take-up/project position to command a mandatory project mode.

During the transit period between the logic disc off position and its take-up/project position, the following events occur. The contacts F1/F8 close. However, since the electrical continuity of the unprocessed cassette was broken at the end of the develop mode, the K1 relay does not energize when the contacts F1/F8 close during the logic disc transit to take-up/project position. The logic disc contacts F4/F6 open to break power to the logic disc clutch magnet coil 82 to permit the detent pawl 80 to stop the logic disc when it reaches its take-up/project position. The logic disc contacts F1/F2 momentarily close to discharge capacitor C1 and reset the mode change circuit 124. Logic disc contacts F1/F3 are closed to set up the RC time constant delay period of 3 seconds for mode change action. Logic disc contacts F4/F7 are closed to provide a connection from the clutch magnet coil 82 to the remote control unit 152 for instant replay operation. Logic disc contacts F9/F10 are closed to provide a constant current source for the input of the DC motor control amplifier. Logic disc contacts F6/F12 are closed to set up a charge on the capacitor C7 in the exponential current source circuit of the DC motor control circuit 134. In addition, the following events are initiated by rotation of the logic disc cam shaft. Cam CM1 actuates the spindle assembly for engagement between the spindles and wheel hubs of the cassette. Cam CM6 actuates switch S4A to turn on the projection lamp. Cam CM6 also opens switch S4B to disconnect the exponential current source from the input of the DC motor control circuit. Cam CM11 effects the engagement and retention of the cassette snubber in a fixed position. Cam CM12 releases the retracted shuttle for engagement with the film.

The mandatory project mode programmed for the undeveloped-film cassette cycle is identical to the normal project cycle which is initiated upon inserting a processed cassette into the processor/projector. The following events occur during the project mode. The logic disc clutch pawl 80 stops the logic disc 44 in the take-up/project position. The shuttle mechanism is effective to transport film from the supply reel to the take-up reel for normal projection. It is important to note at this juncture that as the film is advanced by the shuttle from the supply reel to the take-up reel, the processed film is dried both by (1) exposure to the radiant heat of the projection lamp and (2) by the action of a blower system which forces a flow of air into the aperture 32 provided in the cassette to assist in drying the film and cooling the prism 34. The project mode proceeds in normal manner with the film being projected onto the processor/projector screen. At the end of the film, the shuttle encounters an opening in the film disabling it from further advancement of film. Accordingly, the take-up reel ceases rotating, initiating a charging of the mode change capacitor C1. After a delay of 3 seconds, the charge on C1 reaches a level sufficient to break down the zener diode DZ2 and forward bias the transistor Q2 into conduction. This energizes the logic disc clutch magnet coil 82, thereby initiating rotation of the logic disc 44 toward its develop/rewind position.

d. Rewind Mode Conditioning and Actuation

During the transit period of the logic disc from its project position to its develop/rewind position, the following logic disc contact changes occur. The mode change delay contacts F1/F3 open. However, the normally-closed relay contacts K1B remain closed thereby retaining 3 seconds as the mode change actuation delay period. Contacts F1/F2 close to maintain the capacitor C1 discharged until the rewind mode is underway. The contacts F9/F10 open to disconnect the constant current source bias from the DC motor control circuit 134. The contacts F6/F12 open to initiate the exponential discharge current source for the DC motor control circuit 134. The contacts F9/F11 close to override the effects of the exponential DC motor control and to provide a high current input level to the DC control drive amplifier to generate a high speed/torque characteristic. These contacts are in series with a normally-closed set of contacts K1C associated with the de-energized programming relay K1, thereby providing the high speed/torque characteristics in rewind only.

The cams associated with the logic disc cam shaft cause the following events to occur during the transit period between the logic disc take-up/project position and logic disc develop/rewind position. Cam CM4 is effective to close power hold-on switch S3A which provides an alternate electrical connection between the AC line power and the motor former for a carryover type of operation to be described further on. Cam CM4 also closes the switch S3B in the output circuit of the remote replay control. Cam CM5 actuates the motor polarity switch S5A to condition the motor for rotation in the rewind direction. It should be noted that cam CM5 also closes the subcycle trigger switch S5B. However, since the relay contacts K1E are opened, the 3½ second pulse subcycle has no effect. Cam CM6 actuates switch S4A to open the electrical circuit of the projection lamp, de-energizing the lamp. Cam CM6 also closes switch S4B in the motor control circuit inserting the exponential current source into the input circuit of the DC motor control amplifier. Cam CM10 actuates the blinder assembly to close the optical ports in the cassette and also actuates a lifter assembly to lift the cassette pressure plate away from the film. Cam CM11 actuates a retraction of the snubber retainer to reduce film friction by permitting free roller action of the snubber. Cam CM12 retracts the shuttle from film engagement.

During the rewind mode, the drive motor drives the supply reel at a relatively high exponentially-decreasing speed. It should be noted that during the normal rewind mode as opposed to the develop mode, the output of the exponential RC circuit is presented to the base of the transistor Q7 in the motor control amplifier and also connected to ground via resistor R22. Accordingly, the base voltage of the transistor Q7 is maintained at a generally overall lower voltage level during normal rewind mode than during the develop mode, resulting in an overall higher speed level during normal rewind mode than during develop mode. Although the exponentially-decreasing signal generated by the discharge of the capacitor C7 continues to have the effect of forcing the motor to follow an exponentially-decreasing speed curve, the exponential speed curve during rewind is less pronounced than that during the develop mode and, as indicated, results in an overall higher speed level during the rewind mode than during the develop mode. Once the film has been completely rewound onto the supply reel, the take-up reel stalls. This stall condition is sensed by the mode change circuit 124 which, in the manner previously described, allows the mode change capacitor C1 to accumulate a charge which after a delay of about 3 seconds reaches a level sufficient to bring the mode change driver transistor Q2 into conduction to energize the logic disc clutch magnet coil 82. This releases the logic disc detent pawl 80, initiating rotation of the logic disc 44 from its develop/rewind position toward its off position.

e. Off Mode Conditioning and Actuation

As the logic mechanism proceeds toward its off position, the logic mechanism causes the following events to occur. Contacts F1/F2 close to discharge the mode change capacitor C1 causing the logic disc clutch magnet 82 to de-energize, thereby releasing the logic disc detent pawl 80 to stop the logic disc 44 when it reaches its off position. The contacts F4/F6 close to present a ground return path for the logic disc clutch magnet coil 82 to condition the system for logic disc advancement when the next cassette is inserted into the processor/projector. The contacts F9//F11 open to disconnect the high current source from the DC motor control circuit 134.

In addition, the cams associated with the logic disc cam shaft cause the following events to occur during the logic disc transit to off position. Cam CM1 effects a retraction of the drive spindle from engagement with the reel hubs of the cassette. The cam CM7 releases the cassette latching mechanism opening the switches S1A and S1B of the power supply circuit. Cam CM8 actuates the cassette ejection mechanism to displace the cassette for ease of removal. Cam CM10 retracts the blinder and pressure plate lifter mechanism. Cam CM4 opens switch S3A of the power hold-on switch. This breaks the line power continuity to the motor former just prior to the off position of the logic disc and just prior to closure of the logic disc contacts F4/F6. The inertia of the motor provides completion of the rotary action. Also, switch S3B is opened, breaking the output circuit of the remote control replay unit. Cam CM5 actuates the switch S5A to reverse the polarity connections of the DC motor to prepare the motor for the take-up/project mode of operation. The processor/projector is now de-energized and conditioned to be properly actuated upon insertion of either a processed or unprocessed cassette.

2. The Processed-Film Operating Cycle

The processed-film operating cycle is the normally-programmed operating cycle of the processor/projector, that is, it is the operating cycle which will be executed when the programming relay K1 is not energized.

As previously indicated, the processed-film operating cycle comprises the project mode and the rewind mode which are the same as the corresponding modes in the unprocessed-film operating cycle and, hence, need not be further described.

MANUAL CONTROL

At this juncture consideration may be given to the remote control replay unit 152. As diagrammatically depicted in FIG. 3, the replay unit 152 is connected to the main circuitry by mating-plug contact pairs P1, P2, P3, and P4. The leads from the remote replay unit to the mating plug may form a cord of substantial length to enable replay actuation by the operator from a remote location. The remote control replay unit 152 comprises a pulse former circuit 153 and a pair of conventional one-shot multivibrator circuits 154 and 155 in series. The first one-shot multivibrator has a ½ second unstable period, and the second one-shot multivibrator has a 40 millisecond unstable period. The pulse former circuit 153 comprises the capacitor C4 and resistors R10 and R11. The switch S7 is a manually actuatable switch which is normally urged to the position shown in FIG. 3 grounding the pulse former circuit and maintaining a charge on capacitor C4. Whenever switch S7 is manually depressed during the project mode, the clutch magnet coil 82 is grounded through disc contacts F4/F7 and switch S7. This energizes the logic disc assembly to advance to its develop/rewind position, and the processor/projector begins rewinding film onto the supply reel. The contacts F4/F7 open during logic disc transit to its develop/rewind position. Hence, so long as the switch S7 continues to be held depressed, the processor/projector will continue to rewind film onto the supply reel. Should the end of the film be reached while the switch S7 is depressed, the mode change actuator circuit will index the logic disc to its off position and eject the cassette. If the switch S7 is released prior to the end of the film, the capacitor C4 will couple a negative-going voltage pulse to the one-shot multivibrator 154 which initiates ½ second unstable period causing the multivibrator to deliver a positive pulse of ½ second duration to one-shot multivibrator 155. The negative-going voltage change at the end of the ½ second pulse is effective to initiate the 40 millisecond unstable period of the one-shot multivibrator 155. This causes the one-shot multivibrator 155 to deliver a positive pulse of 40 milliseconds duration through coupling resistor R43 to the base of the NPN transistor Q5 forward biasing the transistor Q5 into conduction for a period of 40 milliseconds. Since the switch S3B is closed when the logic disc is in its develop/rewind position, the momentary conduction by the transistor Q5 energizes both the clutch magnet coil 82 and the operating cycle selector relay K1 causing the relay K1 to latch on via closure of relay contact K1A. Thus, conduction by the transistor Q5 causes the control system to simulate the end of the develop mode. Hence, the logic disc advances past its off position to its project position, and the process/projector again projects providing replay viewing.

Another manually actuatable switch S9 is provided in the control circuit of FIG. 3 which is separated from the remote play unit 152. The switch S9 serves as a manual mode change actuator switch for the operator. The switch S9 is normally urged to its position shown in FIG. 3 in which it completes the ground return path through the processed/unprocessed film indicator contacts 35 and 37. However, when the switch S9 is manually depressed momentarily, it energizes the clutch magnet coil 82 to advance the logic disc to its next logic position thereby initiating the next programmed operating mode of the processor/projector. If the switch S9 is maintained depressed for a period greater than ⅓ second, the system will reject off mode and eject the cassette.

ALTERNATIVE MOTOR CONTROL CIRCUIT

Figure 10:
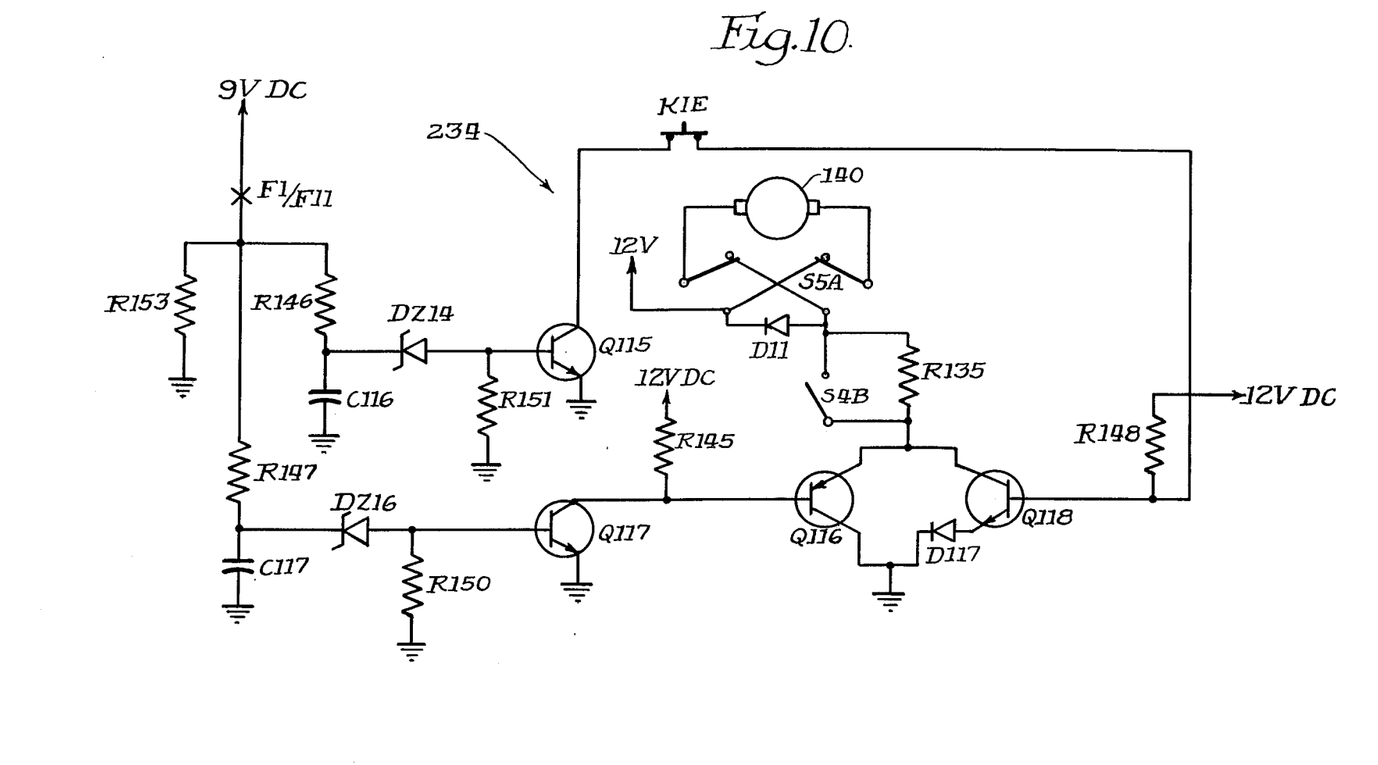
FIG. 10 is an alternative form of motor control circuit which may be used in the system of the present invention.

Referring now to FIG. 10, there is shown an alternative form of motor control circuit 234 for use in the control system of the present invention. The elements bearing the same reference characters as in FIG. 3 function in the same manner as in the motor control circuit 134 previously described.

The alternative motor control circuit 234 is intended to be used when the film processor/projector unit does not require closely controlled uniformity of application of processing fluid during the develop mode which is provided by the constant lineal speed control of film movement achieved by the motor control circuit 134 during the develop mode. The alternative motor control circuit 234 applies the 12 volt DC supply voltage across the DC motor 140, normally conductive transistor Q118, and series dropping resistor R135 during the project mode and the major portion of the develop mode thereby providing essentially the requisite drive torque without closed loop speed control. During the rewind mode, the dropping resistor R135 is shunted by cammed closure of a switch S4B, thereby applying a higher level of drive torque to achieve a more rapid film movement.

The motor control circuit 234 also makes use of a different form of circuitry for achieving the initial conditioning subcycle at the outset of the develop mode. More specifically, two timing circuits are provided, a first timing circuit associated with the NPN transistor Q115 and a second timing circuit associated with the NPN transistor Q117. At the outset of the develop mode, the motor 140 begins rotation in rewind direction in response to cam actuation of motor switch S5A. Motor current flows through the collector-emitter circuit of NPN transistor Q118 which is normally biased into conduction by a base-emitter current flow from the resistor R148 connected to the 12 volt DC supply. Also at the outset of the develop mode, closure of the contacts F1/F11 initiates charging of the capacitor C116 through resistor R146. After approximately ½ second, the charge on capacitor C116 reaches a level sufficient to break down the zener diode DZ14 thereby forward-biasing the base-emitter junction of the NPN transistor Q115 to render the transistor Q115 conductive. Since the relay contacts K1E are closed during the develop mode, conduction by the transistor Q115 effectively grounds the base of the transistor Q118 rendering the transistor Q118 non-conductive. This interrupts the flow of current through the motor 140 to stop the motor. However, initial closure of the contacts F1/F11 also initiated charging of the capacitor C117 through the resistor R147. The charging time constant for the capacitor C117 is substantially greater than the charging time constant for the capacitor C116. Therefore, at a predetermined time (approximately 3 seconds) after the first timing capacitor C116 is effective to stop the motor 140, the second timing capacitor C117 reaches a charge level sufficient to break down the zener diode DZ16 thereby forward-biasing the NPN transistor Q117 into conduction. Conduction by the transistor Q117 causes a voltage drop across the resistor R145 to effectively ground the base of the PNP transistor Q116 causing conduction. Conduction by the transistor Q116 permits motor current to flow, and the motor 140 begins running again in the rewind direction. At the end of the develop period, the contacts F1/F11 open, permitting the capacitors C116 and C117 to discharge through the resistor R153 to permit transistor Q118 to return to its normally conductive state and permitting the transistor Q117 to return to its normally non-conductive state. During the rewind mode, the relay contacts K1E are open so that conduction by the transistor Q118 is not interrupted.

It will be appreciated by those skilled in the art that modifications and changes may be made in the foregoing exemplary embodiment of the control system of this invention without departing from the scope or spirit of the invention. Moreover, it will be appreciated that where the system is applied to a processing unit only, the system may be continuously programmed for the unprocessed-film operating cycle and that some logic sequences applicable to projection apparatus may be modified or deleted.

What is claimed is:

1. A control system for apparatus adapted for handling film maintained on supply and take-up reels contained within a cassette, said control system comprising:
   function programming means for programming the sequence and execution of plural operation modes of said apparatus, said function programming means including a central logic control means having a plurality of logic positions and stepping means for advancing said logic unit unidirectionally from one logic position to another;
   reel drive control means having plural drive control modes adapted to be programmed by said function programmer; and
   mode change actuator means responsive to cessation of film movement to actuate said stepping means for changing the logic position of said central logic control means.

2. The invention defined in claim 1 wherein said central logic control means comprises a rotary unit having angularly-spaced logic positions.

3. The invention defined in claim 2 wherein said rotary unit has a first operating cycle which is completed by one revolution of said rotary unit and a second operating cycle which is completed by two revolutions of said rotary unit.

4. The invention defined in claim 3 wherein said function programming means further comprises an operating cycle selector for programming the control system for either said first operating cycle or said second operating cycle and including means active in response to selection of said second operating cycle for preventing termination of operation of said apparatus and preventing termination of rotary movement of said rotary unit at the end of one revolution of said rotary unit to enable said rotary unit to complete a second revolution.

5. The invention defined in claim 4 wherein control system is adapted for use with a cassette having indicator means for indicating whether the film in processed or unprocessed and herein said operating cycle selector is responsive to said indicator means to program said control system for said first operating cycle for processed film and said second operating cycle for unprocessed film.

6. A control system for apparatus adapted to process and project film maintained on supply and take-up reels contained within a cassette, said control system comprising:
   an operating cycle selector for programming the control system for either an unprocessed-film operating cycle or a processed-film operating cycle;
   a logic unit having plural logic modes for programming the sequence and execution of plural operational modes of said apparatus during an operating cycle;
   reel drive control means having plural drive control modes adapted to be programmed by said operating cycle selector and said logic unit; and
   mode change actuator means responsive to cessation of film movement for changing the logic mode of said logic unit in response to a cessation of film movement.

7. The control system defined in claim 6 wherein said control system is adapted for use with a cassette having indicator means for indicating whether the film is processed or unprocessed and wherein said operating cycle selector is responsive to said indicator means to program said control system for either an unprocessed-film operating cycle or a processed-film operating cycle.

8. The control system defined in claim 6 wherein said logic unit comprises a rotary electrical contact disc and cam shaft assembly for effecting logic sequencing, said logic unit having plural logic modes corresponding to predetermined rotational positions of said rotary electrical contact disc and cam shaft assembly.

9. The control system defined in claim 8 wherein said mode change actuator means comprises means responsive to cessation of rotation of said take-up reel to effect rotation of said electrical contact disc and cam shaft assembly to its next logic mode rotational position.

10. A control system for apparatus adapted to process and project film maintained on supply and take-up reels contained within a cassette, said control system comprising:
   an operating cycle selector for programming the control system for either an unprocessed-film operating cycle or a processed-film operating cycle, said unprocessed-film operating cycle including sequentially the following operational modes,
   a take-up mode in which the apparatus is programmed to advance unprocessed-film onto the take-up reel,
   a develop mode in which the apparatus is programmed to transport the film from the take-up reel to the supply reel for processing in transit to the supply reel,
   a mandatory project mode in which the processed-film is transported from the supply reel to the take-up reel with a projection lamp energized for simultaneously drying and projecting the film, and
   a rewind mode in which the projected film is rewound onto the supply reel following which the apparatus is de-energized and the cassette ejected
   said processed-film operating cycle including sequentially the following operational modes,
   a project mode in which the film is transported from the supply reel to the take-up reel and projected, and a rewind mode in which the projected film is rewound onto the supply reel following which the apparatus is de-energized and the cassette ejected;

a logic unit having plural logic modes for programming the sequence and execution of plural operational modes of said apparatus during an operating cycle;

reel drive control means having plural drive control modes adapted to be programmed by said operating cycle selector and said logic means; and mode change actuator means responsive to cessation of film movement for changing the logic mode of said logic unit in response to a cessation of film movement.

11. The control system defined in claim 10 further comprising replay means for interrupting projection to rewind a portion of the film in response to manual actuation and then simulating the develop mode logic followed by projection thereof without de-energizing the apparatus or ejecting the cassette subsequent to said rewind of said film portion.

12. The control system defined in claim 10 wherein said control system is adapted for use with a cassette having indicator means for indicating whether the film is processed or unprocessed and wherein said operating cycle selector is responsive to said indicator means to program said control system for either an unprocessed-film operating cycle or a processed-film operating cycle.

13. The control system defined in claim 12 wherein said operating cycle selector comprises an electrical relay means for completing a circuit to energize said relay in response to an unprocessed-film indication by said cassette indicator means and switch contacts controlled by said relay for programming said control system for an unprocessed-film operational mode in response to energization of said relay.

14. The control system defined in claim 12 wherein said logic unit comprises a rotary electrical contact disc and cam shaft assembly for effecting logic sequencing, said rotary electrical contact disc and cam shaft assembly having predetermined rotational logic positions corresponding to particular operational modes of said apparatus.

15. The control system defined in claim 14 wherein said mode change actuator means comprises means responsive to cessation of rotation of said take-up reel to effect rotation of said electrical contact disc and cam shaft assembly to its next rotational logic position.

16. A control system for apparatus adapted to process and project film maintained on supply and take-up reels contained within a cassette, the cassette having indicator means for indicating whether the film is processed or unprocessed, said control system comprising:

an operating cycle selector for programming the control system for either an unprocessed-film operating cycle or a processed-film operating cycle;

a logic unit having plural logic modes for programming the sequence and execution of plural operational modes of said apparatus during an operating cycle;

reel drive control means having plural drive control modes adapted to be programmed by said operating cycle selector and said logic unit; and mode change actuator means responsive to cessation of film movement for changing the logic mode of said logic unit in response to a cessation of film movement, a. in said unprocessed-film cycle programmed by said cycle selector,
  i. said logic unit functions to first condition and actuate said apparatus for a take-up mode comprising advancement of exposed film onto the take-up reel,
  ii. upon cessation of said film advancement onto the take-up reel, said mode change actuator means and said logic unit cooperate to condition and actuate said apparatus for a develop mode comprising transport of the film from the take-up reel to the supply reel without exposure to ambient light for in-transit processing of the film,
  iii. upon cessation of said film transport in said develop mode, said mode change actuator means and said logic unit cooperate to condition and actuate said apparatus for a mandatory project mode comprising transport of the film by a projection shuttle in projection direction with a projection lamp energized for simultaneously drying and projecting said film,
  iv. upon cessation of said film transport in said project mode, said mode change actuator means and said logic unit cooperate to condition and actuate said apparatus for a rewind mode to rewind the film onto said supply reel, and
  v. upon cessation of said film rewind into said supply reel, said mode change actuator means and said logic unit cooperate to condition and actuate said apparatus for off mode in which the apparatus is de-energized and the cassette is ejected, b. in said processed-film cycle programmed by said cycle selector,
  i. said logic unit is effective to first condition and actuate said apparatus for a project mode comprising transport of the film by a projection shuttle in projection direction with a projection lamp energized for the film,
  ii. upon cessation of said film transport in said processed-film cycle project mode, said mode change actuator means and said logic unit cooperate to condition and actuate said apparatus for a rewind mode to rewind the film onto said supply reel, and
  iii. upon cessation of said film rewind in said processed-film cycle rewind mode, said mode change actuator means and said logic unit cooperate to condition and actuate said apparatus for off mode in which the apparatus is de-energized and the cassette ejected.

17. The control system defined in claim 16 further comprising remote replay means for interrupting projection to rewind a portion of the film in response to manual actuation of said replay means followed by projection thereof without interim off mode de-energization of the apparatus or ejection of the cassette by simulating develop mode logic following said rewind of a portion of the film.

18. The control system defined in claim 16 wherein said operating cycle selector comprises an electrical relay means for completing a circuit to energize said relay in response to an unprocessed-film indication by said cassette indicator means and switch contacts controlled by said relay for programming said control system for an unprocessed-film operational mode in response to energization of said relay.

19. The control system defined in claim 16 wherein said logic unit comprises a rotary electrical contact disc and cam shaft assembly for effecting logic sequencing, said logic unit having plural logic modes corresponding to predetermined rotational positions of said rotary electrical contact disc and cam shaft assembly.

20. The control system defined in claim 19 wherein said mode change actuator means comprises means responsive to cessation of rotation of said take-up reel to effect rotation of said electrical contact disc and cam shaft assembly to its next rotational logic mode position.

21. A control system for apparatus adapted for handling film maintained on supply and take-up reels contained within a cassette, said control system comprising:
function programming means having plural logic modes for programming the sequence and execution of plural operational modes of said apparatus, said function programming means comprising an operating cycle selector for programming the control system for either an unprocessed-film operating cycle or a processed-film operation cycle and a logc unit for programming the sequence and execution of said plural operation modes of said apparatus during an operating cycle;
reel drive control means having plural drive control modes adapted to be programmed by said function programmer; and
mode change actuator means responsive to cessation of film movement for changing the logic mode of said function programmer.

22. A control system for apparatus adapted for handling film maintained on supply and take-up reels contained within a cassette, said control system comprising:
function programming means having plural logic modes for programming the sequence and execution of plural operational modes of said apparatus, said operational modes including sequentially
a take-up mode in which the apparatus is programmed to advance unprocessed-film onto the take-up reel,
a develop mode in which the apparatus is programmed to transport the film from the take-up reel to the supply reel for processing in transit to the supply reel, and
a mandatory project mode in which the processed-film is transported from the supply reel to the take-up reel with a projection lamp energized for simultaneously drying and projecting the film;
reel drive control means having plural drive control modes adapted to be programmed by said function programmer; and
mode change actuator means responsive to cessation of film movement for changing the logic mode of said function programmer.

23. The control system defined in claim 22 wherein said function programming means includes a rotary electrical contact disc and cam shaft assembly for effecting logic sequencing, said operational modes of said apparatus corresponding to predetermined rotational logic positions of said rotary electrical contact disc and cam shaft assembly.

24. The control system defined in claim 23 wherein said mode change actuator means comprises means responsive to cessation of rotation of said take-up reel to effect rotation of said electrical contact disc and cam shaft assembly to its next rotational logic position.

* * * * *